(12) United States Patent
Park et al.

(10) Patent No.: US 12,491,311 B2
(45) Date of Patent: Dec. 9, 2025

(54) DRUG DELIVERY DEVICE

(71) Applicant: DAEGU GYEONGBUK INSTITUTE OF SCIENCE AND TECHNOLOGY, Daegu (KR)

(72) Inventors: Suk Ho Park, Gwangju (KR); Ji Hun Lee, Busan (KR); Seung Un Yang, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 712 days.

(21) Appl. No.: 17/909,609

(22) PCT Filed: Dec. 17, 2020

(86) PCT No.: PCT/KR2020/018608
§ 371 (c)(1),
(2) Date: Sep. 6, 2022

(87) PCT Pub. No.: WO2021/201379
PCT Pub. Date: Oct. 7, 2021

(65) Prior Publication Data
US 2023/0106869 A1 Apr. 6, 2023

(30) Foreign Application Priority Data

Apr. 3, 2020 (KR) .................. 10-2020-0040731

(51) Int. Cl.
*A61M 5/142* (2006.01)
(52) U.S. Cl.
CPC .............. *A61M 5/14248* (2013.01); *A61M 2005/14252* (2013.01); *A61M 2205/276* (2013.01)

(58) Field of Classification Search
CPC .. A61M 2005/14252; A61M 2205/276; A61M 2005/1426; A61M 5/1626;
(Continued)

(56) References Cited

U.S. PATENT DOCUMENTS 11,672,920 B2 * 6/2023 Nakajima ........... A61M 5/3293
604/198
2008/0015516 A1 1/2008 Lavi
(Continued)

FOREIGN PATENT DOCUMENTS

CN 1887373 A 1/2007
JP 2002509004 A 3/2002
(Continued)

OTHER PUBLICATIONS

International Search Report for International Application No. PCT/KR2020/018608 dated Apr. 6, 2021.
(Continued)

*Primary Examiner* — Bhisma Mehta
*Assistant Examiner* — Marissa Taylor
(74) *Attorney, Agent, or Firm* — Sughrue Mion, PLLC

(57) ABSTRACT

A drug delivery device according to an embodiment may include a body including an opening; a magnetic element disposed in the body; a reservoir disposed in the body, connected to the magnetic element, and configured to store a drug; and an opening/closing structure coupled to the body and configured to open or close the opening.

13 Claims, 12 Drawing Sheets

(58) Field of Classification Search
CPC .......... A61M 25/0127; A61M 5/31593; A61M 16/0816; A61M 5/14248
See application file for complete search history.

(56) References Cited

U.S. PATENT DOCUMENTS

| | | |
|---|---|---|
| 2015/0231382 A1 | 8/2015 | Altarac |
| 2015/0335828 A1* | 11/2015 | Mathiasson .......... A61M 5/3204 604/192 |
| 2017/0290975 A1* | 10/2017 | Barmaimon .......... F03G 7/0646 |
| 2018/0015231 A1 | 1/2018 | Kawamoto |
| 2018/0296769 A1 | 10/2018 | Wang et al. |
| 2019/0219553 A1 | 7/2019 | Duan et al. |
| 2020/0030589 A1 | 1/2020 | Ben Menachem et al. |

FOREIGN PATENT DOCUMENTS

| | | | |
|---|---|---|---|
| JP | 2019-98013 A | 6/2019 | |
| KR | 10-2016-0082528 A | 7/2016 | |
| KR | 10-2017-0048519 A | 5/2017 | |
| KR | 101786427 B1 | 10/2017 | |
| WO | WO-2019176657 A1 * | 9/2019 | .......... A61M 5/3216 |

OTHER PUBLICATIONS

Communication dated May 22, 2024 issued by the European Patent Office in application No. 20928261.5.

* cited by examiner

DRUG DELIVERY DEVICE

CROSS-REFERENCE TO RELATED APPLICATIONS

This application is a national phase under 35 U.S.C. § 371 of PCT International Application No. PCT/KR2020/018606 which has an International filing date of Dec. 17, 2020, which claims priority to Korean Application No. 10-2020-0040731, filed Apr. 3, 2020, the entire contents of each of which are hereby incorporated by reference.

FIELD

Hereinafter, embodiments relate to a drug delivery device.

BACKGROUND

There have been developed technologies for delivering drugs into bodies in various ways. For example, U.S. Patent Application Publication No. 2009/0234203 discloses a medical capsule. Such a drug delivery device may move in the body by being actively driven. Therefore, there is a need to protect a drug, which is stored to prevent contamination or the like, when the drug delivery device moves toward a lesion positioned at a target position to which the drug is to be delivered.

SUMMARY

An object according to an embodiment is to provide a drug delivery device for protecting a mechanism that serves to deliver a drug while the drug delivery device moves.

A drug delivery device according to one embodiment may include: a body including an opening; a magnetic element disposed in the body; a reservoir disposed in the body, connected to the magnetic element, and configured to store a drug; and an opening/closing structure coupled to the body and configured to open or close the opening, in which a first joint is defined at a portion where the body and the opening/closing structure are coupled, and in which the opening/closing structure is configured to have: a first shape in which the opening/closing structure opens the opening while rotating about the first joint in a first rotation direction; and a second shape in which the opening/closing structure closes the opening while rotating about the first joint in a second rotation direction opposite to the first rotation direction.

The opening/closing structure may include a gate configured to rotate about the first joint.

The body may include: a first inner surface formed at a periphery of the opening and having a curved profile; and a second inner surface configured to define the opening, and the opening/closing structure may move along the first inner surface.

The gate may include: a shell having an outer surface corresponding to a shape of the first inner surface; and a cavity defined in the shell and configured such that at least a part of the reservoir is disposed in the cavity.

The opening/closing structure may include a link, and the link may include: a first coupling portion configured to define the first joint and coupled to the body; and a second coupling portion configured to define the second joint and coupled to the reservoir.

The second coupling portion may rotate about the first coupling portion.

The first joint and the second joint may be positioned on different planes.

The link may include: a first extension portion coupled to the second coupling portion and extending in a first direction; and a second extension portion coupled to the first coupling portion and extending in a second direction intersecting the first direction.

The reservoir may include: a substrate configured to store the drug; and a plurality of needle patches arranged on the substrate and configured to transfer the drug from the substrate.

The link may include: a rotary body coupled to the first coupling portion and configured to rotate about the first joint; and a longitudinal slot formed in the rotary body and configured to engage with the second coupling portion, the slot having a first end and a second end at an opposite side to the first end and being configured to allow the second coupling portion to move between the first end and the second end.

The opening/closing structure may be configured to have a third shape in which the second joint moves from the first end to the second end and at least a part of the reservoir is exposed to the outside of the body through the opening.

The body may further include a stopper protruding from an inner wall of the body and configured to restrict a movement of the gate.

The gate may rotate along an outer surface of the body.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
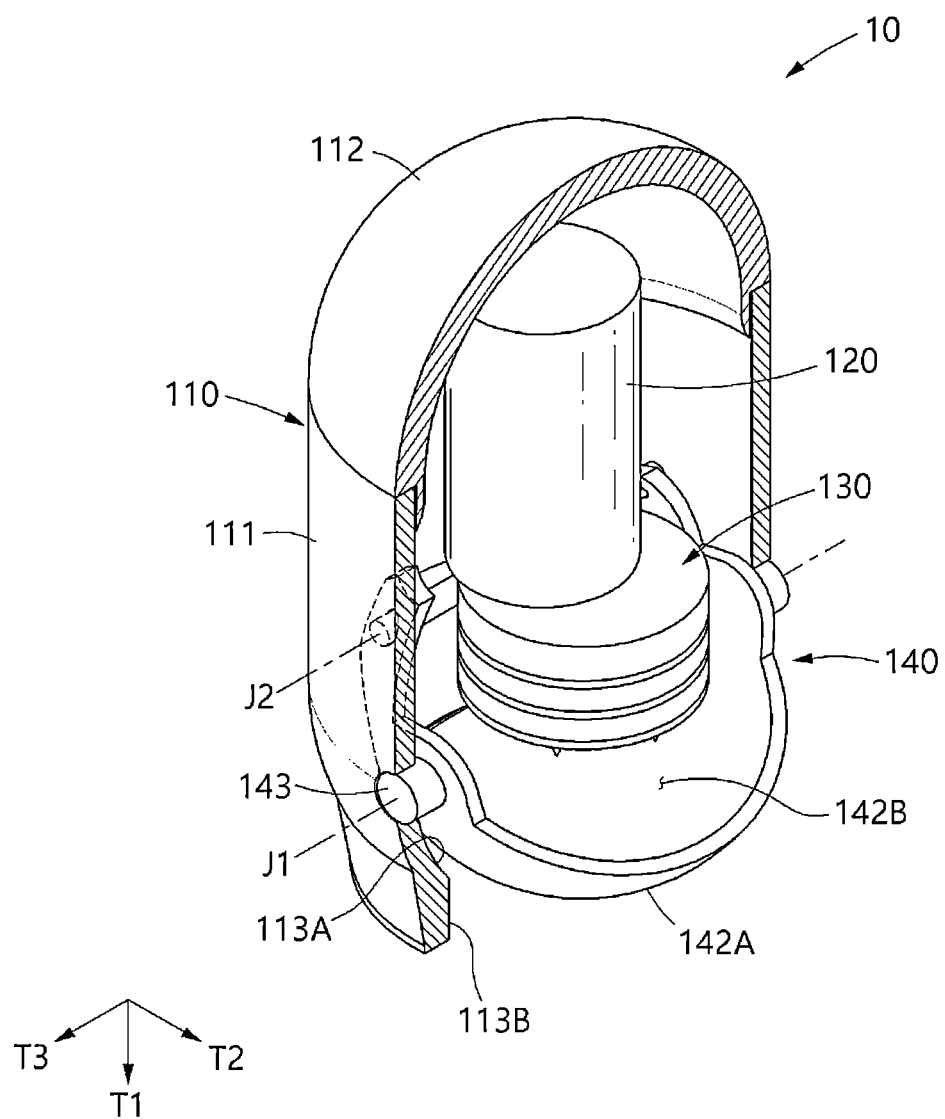
FIG. 1 is a perspective view illustrating a partial cross-section of a drug delivery device according to a first embodiment.

Hereinafter, embodiments will be described in detail with reference to the accompanying drawings. However, the embodiments may be variously changed, and the protection scope of the patent application is not restricted or limited by the embodiments. It should be understood that all alterations, equivalents, and alternatives of the embodiments are included in the protection scope.

The terminologies used in the embodiments are used for the purpose of describing the embodiments only, and it should not be interpreted that the terminologies are intended to limit the embodiments. Singular expressions include plural expressions unless clearly described as different meanings in the context. In the present specification, the terms "comprises," "comprising," "includes," "including," "containing," "has," "having" or other variations thereof are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms used herein, including technical or scientific terms, have the same meaning as commonly understood by those skilled in the art to which the embodiments pertain. The terms such as those defined in a commonly used dictionary should be interpreted as having meanings consistent with meanings in the context of related technologies and should not be interpreted as ideal or excessively formal meanings unless explicitly defined in the present application.

In addition, in the description of the exemplary embodiments with reference to the accompanying drawings, the same constituent elements will be designated by the same reference numerals regardless of reference numerals, and a duplicated description thereof will be omitted. In the description of the embodiment, the specific descriptions of publicly known related technologies will be omitted when it is determined that the specific descriptions may unnecessarily obscure the subject matter of the embodiment.

In addition, the terms first, second, A, B, (a), and (b) may be used to describe constituent elements of the embodiment. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other embodiments. Unless disclosed to the contrary, the configuration disclosed in any one embodiment may be applied to other embodiments, and the specific description of the repeated configuration will be omitted.

Referring to FIG. 1, a drug delivery device 10 may deliver one or more types of drugs to one or more target positions in a body of an object. In this case, the object may be a creature such as a person, an animal, or the like. The drug delivery device 10 may protect a mechanism from the outside, and the mechanism may serve to deliver the drug while the drug delivery device 10 moves in the body of the object. Therefore, the drug to be delivered may be accurately delivered to a desired target position without being contaminated while the drug delivery device moves.

Hereinafter, a structure of a drug delivery device 10 according to a first embodiment will be described with reference to FIGS. 1 to 5. The drug delivery device 10 may include a body 110, a magnetic element 120, a reservoir 130, and an opening/closing structure 140.

The body 110 may define an external shape of the drug delivery device 10 and protect the constituent elements of the drug delivery device 10 from the outside. The body 110 may have a substantial capsule shape. The body 110 may include: a central part 111 having a substantially cylindrical shape; a front part 112 coupled to a front portion of the central part 111 and having a substantially hemispherical shape; and a rear part 113 provided on a rear portion of the central part 111 and having a variable width and a variable thickness. In this case, the terms "front" and "rear" mean directions in which the drug delivery device 10 is directed while the drug delivery device 10 moves. Referring to the drug delivery device 10 illustrated in FIG. 2 based on the above-mentioned definition, the direction in which the drug delivery device 10 moves may be a −T1 direction.

The width of the rear part 113 may decrease in a direction away from the rear portion of the central part 111. In the cross-sectional structure of the drug delivery device 10, the rear part 113 may include a first inner surface 113A having a substantially curved profile, and a second inner surface 113B having a substantially linear profile. In other words, a shape of the rear part 113 defined by the first inner surface 113A may be close to a substantial dome shape, and a shape of the rear part 113 defined by the second inner surface 113B may be close to a substantially cylindrical shape. A partial structure of the rear part 113 defined by the second inner surface 113B may share the same axis X with the central part 111.

The partial structure of the rear part 113 defined by the second inner surface 113B may include an opening 114. The opening 114 may allow the inside of the body 110 and the outside of the body 110 to communicate with each other. A drug stored in the reservoir 130 may be transferred to the outside of the body 110 through the opening 114 and delivered to the target position on the object.

The body 110 may further include a support part 115. The support part 115 may extend toward the central part 111 from a curved inner surface of the front part 112. The support part 115 may support the magnetic element 120 and determine an initial position of the magnetic element 120.

The magnetic element 120 may be operated by being magnetically coupled to an external magnetic drive system. Based on the configuration in which the magnetic element 120 is coupled, the magnetic element 120 may receive a force in a T1 direction toward the opening 114 or receive a force in the −T1 direction away from the opening 114. The magnetic element 120 may be disposed in the body 110. The magnetic element 120 may be a permanent magnet. However, the embodiment is not limited thereto. The magnetic element 120 may be a coil that is operated by being coupled to an external electromagnetic field.

The reservoir 130 may store one or more types of drugs. The reservoir 130 may include a container 132 and a plurality of patches 133. The container 132 may accommodate the plurality of patches 133. For example, the container 132 may have a cylindrical shape. The plurality of patches 133 may be stacked in the container 132.

The plurality of patches 133 may each include a substrate 133A and a plurality of needle patches 133B.

The substrate 133A may store one or more drugs. In the case in which the substrate 133A stores a plurality of types of drugs, a wall may be formed in the substrate 133A to separate the plurality of types of drugs so that the plurality of types of drugs is not mixed with one another. The substrate 133A may have a substantially circular plate shape.

The plurality of needle patches 133B may transfer the drug from the substrate 133A. The plurality of needle patches 133B may be arranged in various shapes on the substrate 133A. The plurality of needle patches 133B may each have a shape protruding from the substrate 133A. In addition, the plurality of needle patches 133B may each have a shape having a width that decreases in a direction away from the substrate 133A. For example, the plurality of needle patches 133B may each have a conical shape.

Figure 5:
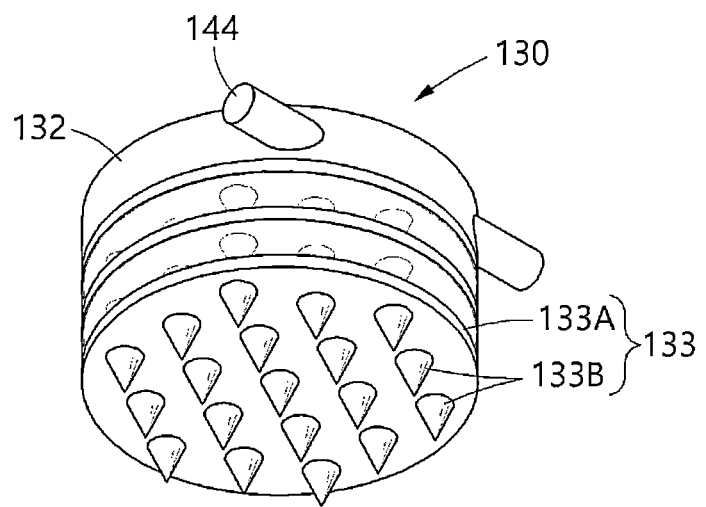
FIG. 5 is a perspective view illustrating a reservoir according to the first embodiment when viewed from below.
Figure 6:
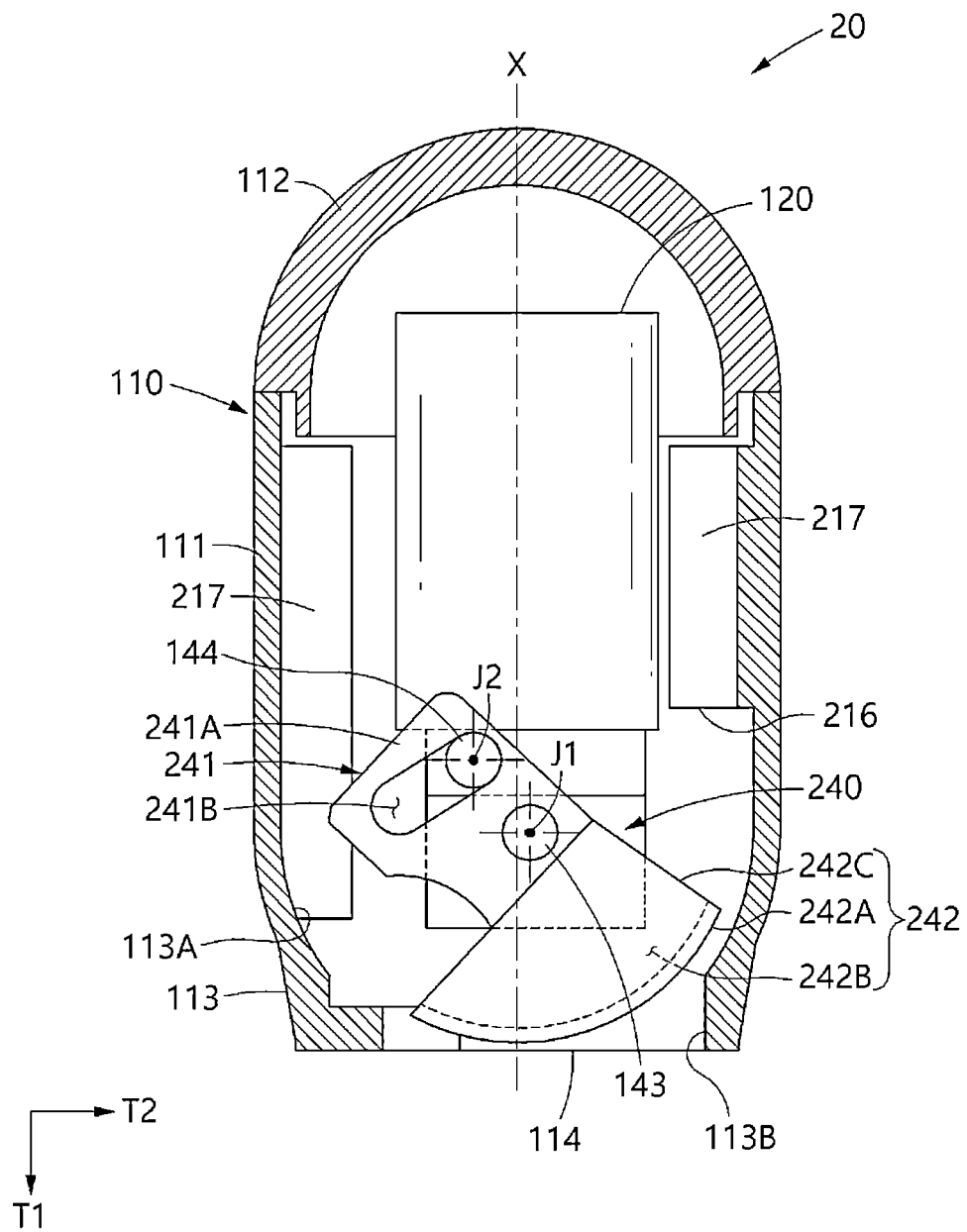
FIG. 6 is a partial cross-sectional view of a drug delivery device according to a second embodiment.
Figure 7:
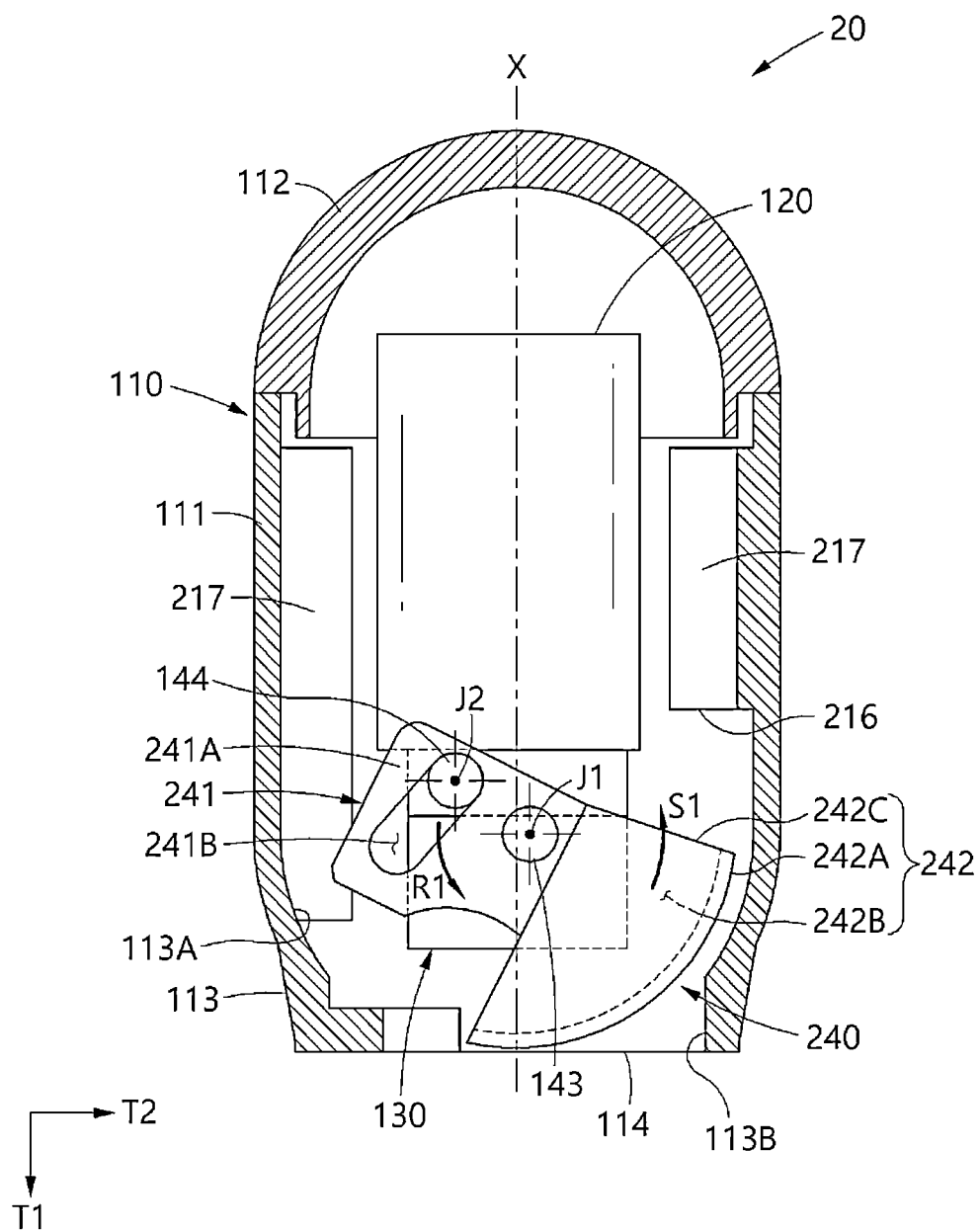
FIGS. 7 to 9 are partial cross-sectional views illustrating a change in the shape of the drug delivery device according to the second embodiment.

However, the reservoir 130 is not limited to the embodiment illustrated in FIG. 5. The reservoir 130 may have various shapes. For example, the reservoir 130 may include the container 132 and a single patch 133.

The opening/closing structure 140 may open or close the opening 114. A structure of the opening/closing structure 140, which serves to open or close the opening 114, is considered important in protecting the reservoir 130 that stores the drug while the drug delivery device 10 moves in the body. The reservoir 130 may be exposed to the outside of the device 10 while the drug delivery device 10 moves. The opening/closing structure 140 may prevent the reservoir 130 from being exposed to the outside of the device 10 until the drug is delivered to the target position, thereby preventing the contamination of the reservoir 130 and preventing the drug from being released to the outside of the device 10 at an undesired position.

The opening/closing structure 140 may include a link 141 and a gate 142.

The link 141 may connect the body 110 and the reservoir 130. The link 141 may include a first extension portion 141A, a second extension portion 141B, a first coupling portion 143 formed on the second extension portion 141B, and a second coupling portion 144 formed on the first extension portion 141A. The first coupling portion 143 may couple the body 110 and the second extension portion 141B, and the second coupling portion 144 may couple the reservoir 130 and the first extension portion 141A.

The first extension portion 141A may extend in the first direction, and the second extension portion 141B may extend in the second direction intersecting the first direction. The first extension portion 141A and the second extension portion 141B may be integrated.

The first coupling portion 143 may have a shape protruding from the second extension portion 141B. The second coupling portion 144 may have a rod shape extending in a longitudinal direction thereof. The second coupling portion 144 may penetrate any portion of the container 132 of the reservoir 130 and be coupled to the container 132. Meanwhile, the first coupling portion 143 and the second coupling portion 144 may be separate constituent elements, but the embodiment is not limited thereto. The first coupling portion 143 and the second coupling portion 144 may be integrated with the body 110, the reservoir 130, and/or the link 141.

A first joint J1 may be defined by the first coupling portion 143, and a second joint J2 may be defined by the second coupling portion 144. In this case, the concept 'joint' may be understood as a concept in which one constituent element and the other constituent element are coupled to each other such that one constituent element moves relative to the other constituent element. For example, the link 141 may rotate about the first joint J1 relative to the body 110 and rotate about the second joint J2 relative to the reservoir 130. Therefore, a condition for restraining the link 141 may be determined depending on a position of the first joint J1, a position of the second joint J2, and a relative positional relationship between the first joint J1 and the second joint J2.

The first joint J1 and the second joint J2 may be positioned on different planes. In other words, the first coupling portion 143, which defines the first joint J1, and the second coupling portion 144, which defines the second joint, may not be positioned on the same line. In addition, the first joint J1 and the second joint J2 may not be positioned on the plane including a virtual centerline X that traverses the central part 111, the front part 112, and the rear part 113 of the body 110. The first joint J1 and the second joint J2 may be respectively spaced apart, in the T2 direction and the −T2 direction, from the plane including the centerline X. In this case, the distance between the first joint J1 and the plane including the centerline X may be shorter than the distance between the second joint J2 and the plane including the centerline X. Alternatively, the first joint J1 may be positioned on the plane including the centerline X.

The gate 142 may open or close the opening 114. The gate 142 may be connected to the link 141. In addition, the gate 142 may be integrated with the link 141.

The gate 142 may include a shell 142A and a cavity 142B. A curved surface of the shell 142A may close the opening 114 by substantially covering a region of the opening 114. A degree to which the opening 114 is opened may be determined depending on a size of an overlap region between the curved surface of the shell 142A and the region of the opening 114. The shell 142A may have a partially spherical shape having a preset thickness. The shell 142A may be disposed adjacent to the opening 114. The cavity 142B may accommodate at least a part of the reservoir 130. The cavity 142B may be formed in a direction in which a center of curvature of the shell 142A is positioned. The cavity 142B may define a space having a size that does not cause interference between the shell 142A and the reservoir 130.

Hereinafter, an operation of the drug delivery device 10 according to the first embodiment will be described with reference to FIGS. 2 to 4.

Figure 2:
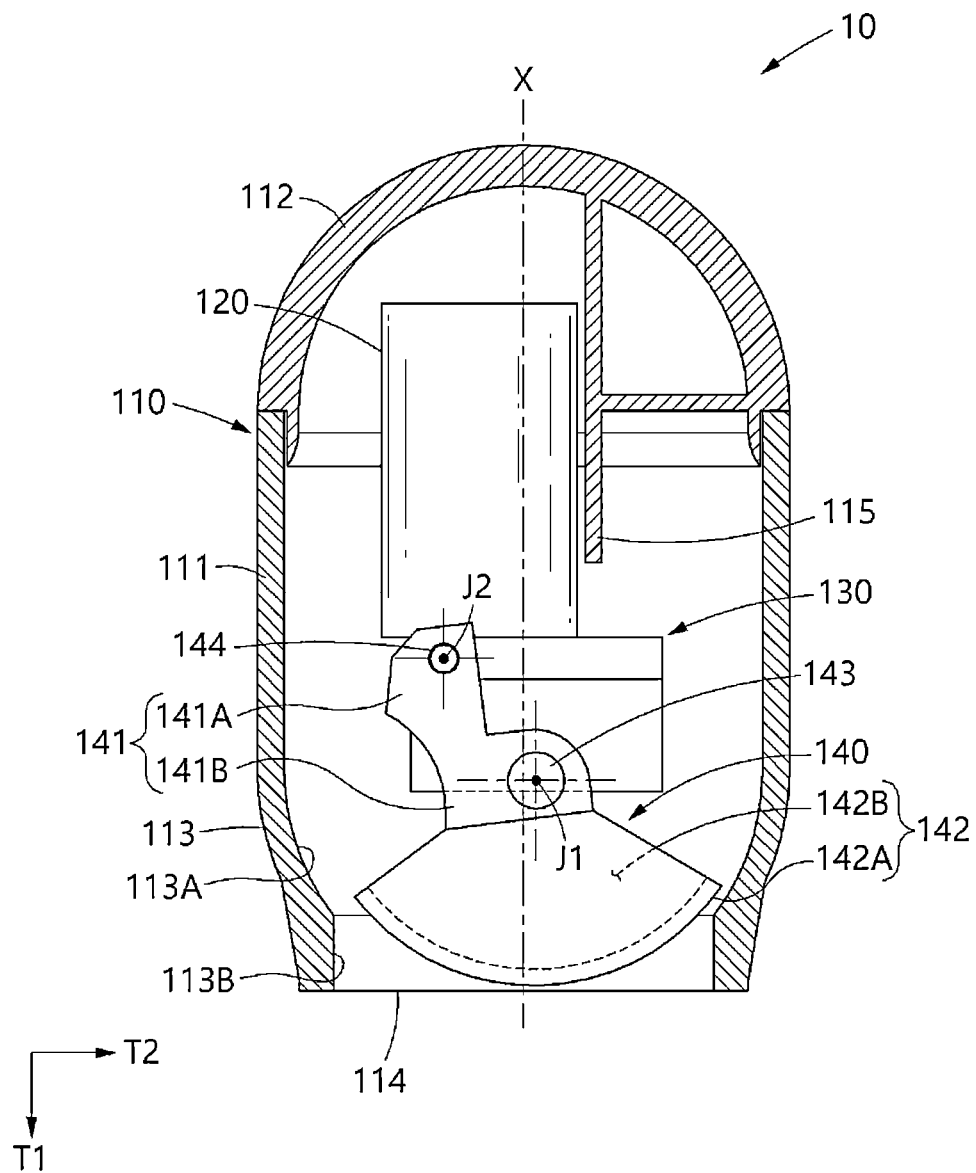
FIG. 2 is a partial cross-sectional view of the drug delivery device according to the first embodiment.

In the state illustrated in FIG. 2, the curved surface of the shell 142A of the gate 142 substantially covers the opening 114, and the opening 114 is closed. As the opening 114 is closed, the reservoir 130 may be prevented from being exposed to the outside of the body 110.

Figure 3:
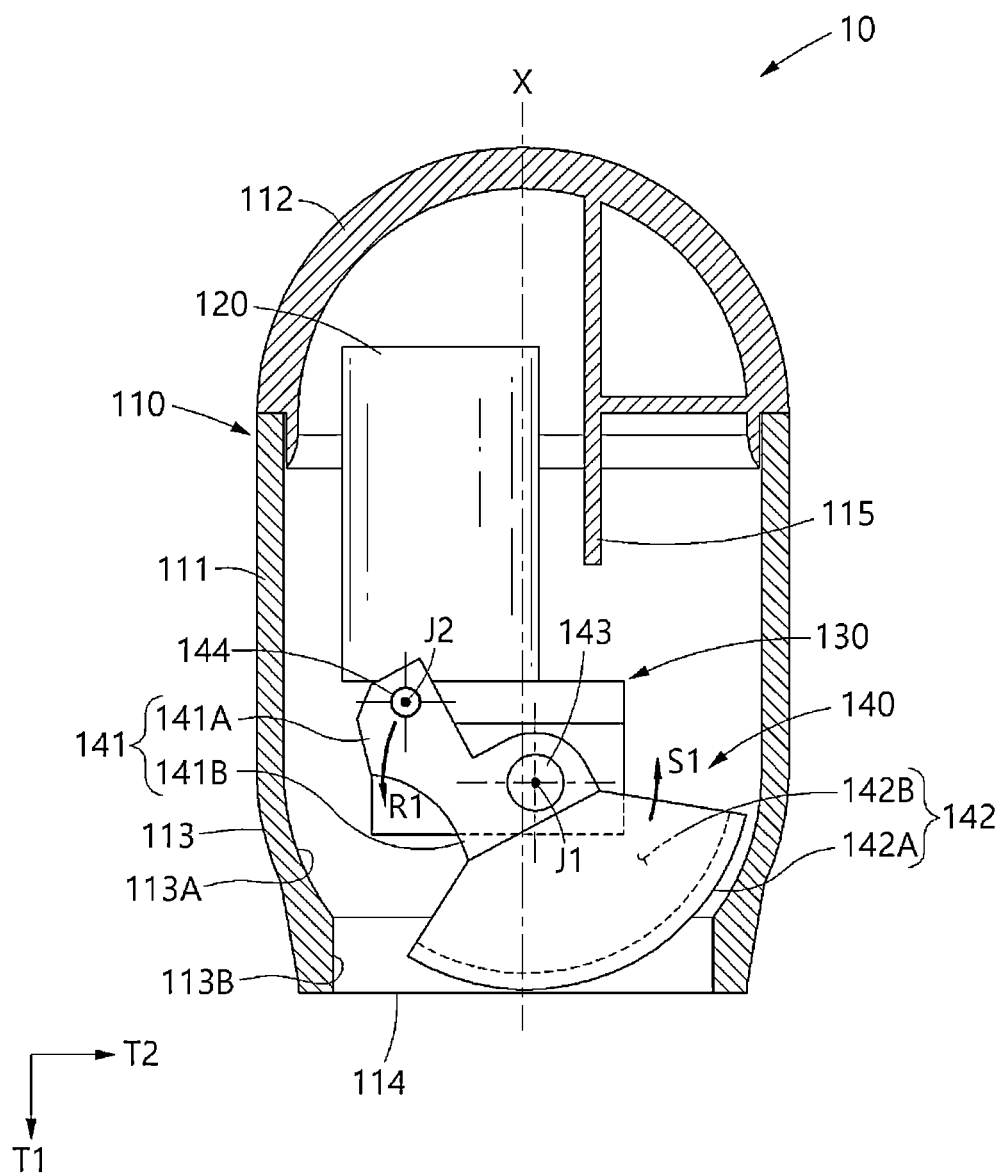
FIGS. 3 and 4 are partial cross-sectional views illustrating a change in the shape of the drug delivery device according to the first embodiment.
Figure 4:
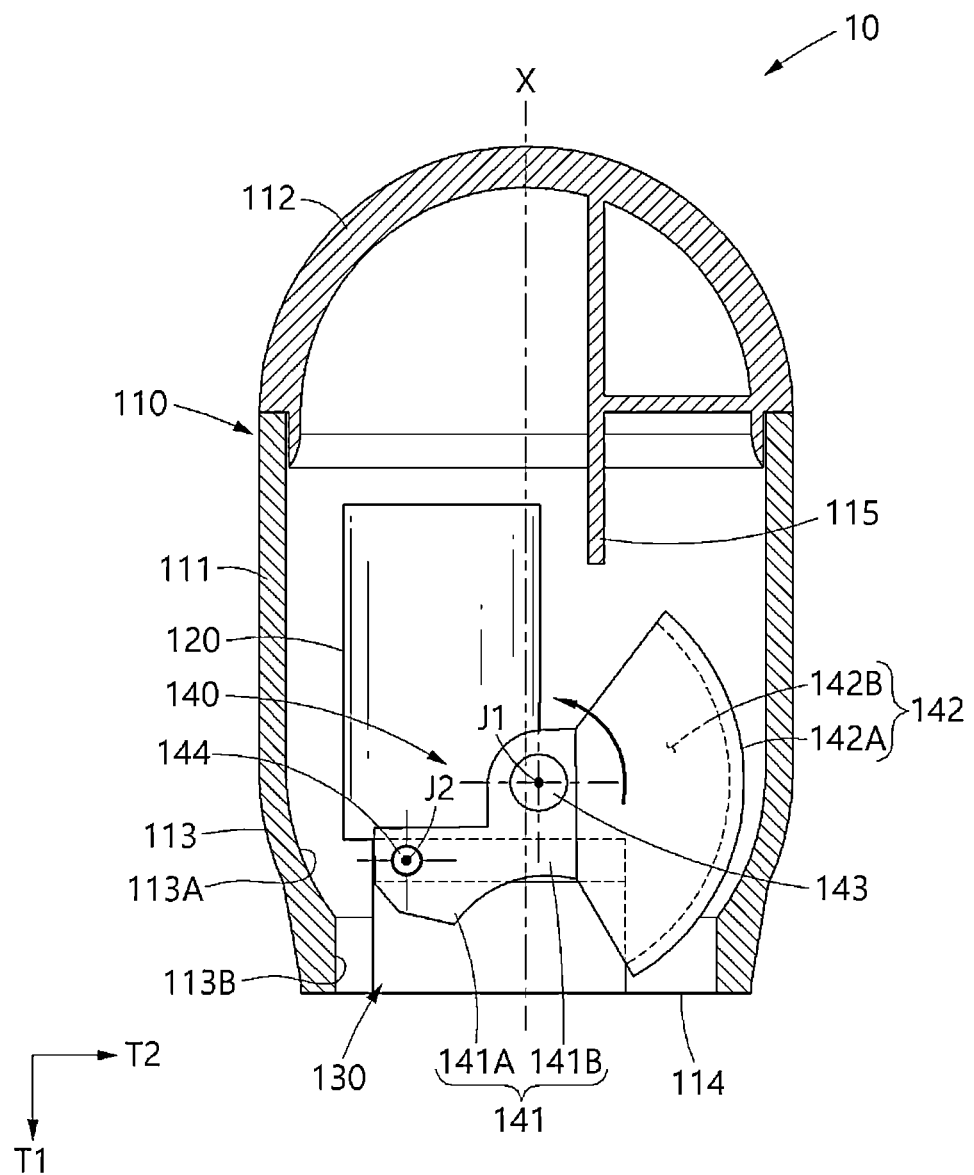

In this state, when the magnetic element 120 is magnetically coupled and receives the force in the direction toward the opening 114, the magnetic element 120 and the reservoir 130 connected to the magnetic element 120 receive the force in the direction toward the opening 114, as illustrated in FIG. 3. Therefore, the moment of force R1, which allows the second joint J2 to rotate about the first joint J1, is generated, such that the link 141 begins to rotate about the first joint J1. In addition, the gate 142 connected to the link 141 also rotates about the first joint J1 and begins to move away from the opening 114 counterclockwise S1. Thereafter, as the shell 142A rotates about the first joint J1 and moves along the first inner surface 113A in the direction away from the opening 114, the overlap region between the curved surface of the shell 142A and the opening 114 decreases, such that a part of the opening 114 is opened.

In this state, when the magnetic element 120 and the reservoir 130 receive the force in the direction toward the opening 114 and the moment of force for allowing the second joint J2 to rotate about the first joint J1 is continuously applied, the overlap region between the curved surface of the shell 142A and the opening 114 remarkably decreases, such that the opening 114 is substantially opened. In this case, the reservoir 130 may be exposed to the outside of the body 110 through the opening 114 without interfering with the shell 142A. The reservoir 130 exposed to the outside of the body 110 may transfer the drug to the target position on the object.

When the transfer of the drug to the target position on the object is completed, the drug delivery device 10 needs to protect the reservoir 130 in order to deliver the drug to another target position on the object. When the magnetic element 120 is magnetically coupled and receives the force in the direction away from the opening 114, the magnetic element 120 and the reservoir 130 connected to the magnetic element 120 begin to move by receiving the force in the direction away from the opening 114, and the moment of force, which allows the second joint J2 to rotate about the first joint J1 clockwise, is generated. Therefore, the link 141 and the gate 142 begin to move clockwise about the first joint J1 and return from the state illustrated in FIG. 4 to the state illustrated in FIG. 2, such that the opening 114 is closed.

Hereinafter, a structure of a drug delivery device 20 according to a second embodiment will be described with reference to FIGS. 6 to 9. The drug delivery device 20 according to the second embodiment is substantially identical in structure to the drug delivery device 10 according to the first embodiment, except for a partial structure of the body 110 and an opening/closing structure 240. Therefore, repeated descriptions of the identical components will be omitted.

In the drug delivery device 20 according to the second embodiment, the body 110 may include a protruding portion 217 protruding from an inner wall of the central part 111 toward a center of the central part 111. The protruding length of the protruding portion 217 may be determined depending on the movement range of the magnetic element 120 in the T2 direction. In other words, the width of the protruding portion 217 in the central part 111 serves as a factor that restricts the movement range of the magnetic element 120.

The protruding portion 217 may include a stopper 216 that restricts the movement of the gate 242. The stopper 216 may be formed as only at least a part of the protruding portion 217 extends in a longitudinal direction along the inner wall of the central part 111. For example, in consideration of the configuration in which the gate 242 rotates about the first joint J1 counterclockwise, the protruding portion 217 may be formed only on an upper portion of the central part 111 without being formed on a lower portion of the central part 111 in order to allow the gate 242 to sufficiently rotate to open the opening 114. In this case, when the gate 242 sufficiently rotates, a lower surface of the protruding portion 217 may come into contact with an edge 242C of the gate 242 at a contact point P. As described above, the lower surface of the protruding portion 217 may serve as the stopper 216 that restricts the movement of the gate 242.

In the drug delivery device 20 according to the second embodiment, the opening/closing structure 240 may include: a link 241 structurally different from the link 141 of the opening/closing structure 140 according to the first embodiment; and the gate 242 structurally different from the gate 142 of the opening/closing structure 140 according to the first embodiment.

The link 241 may include a rotary body 241A configured to rotate about the first joint J1. The rotary body 241A may be coupled to the body 110 through the first coupling portion 143. In addition, the link 241 may include a longitudinal slot 241B formed in the rotary body 241A. The longitudinal slot 241B may have an elongated shape having a first end and a second end. The second coupling portion 144, which defines the second joint J2, may move between the first and second ends of the slot 241B.

Hereinafter, an operation of the drug delivery device 20 according to the second embodiment will be described.

Figure 8:
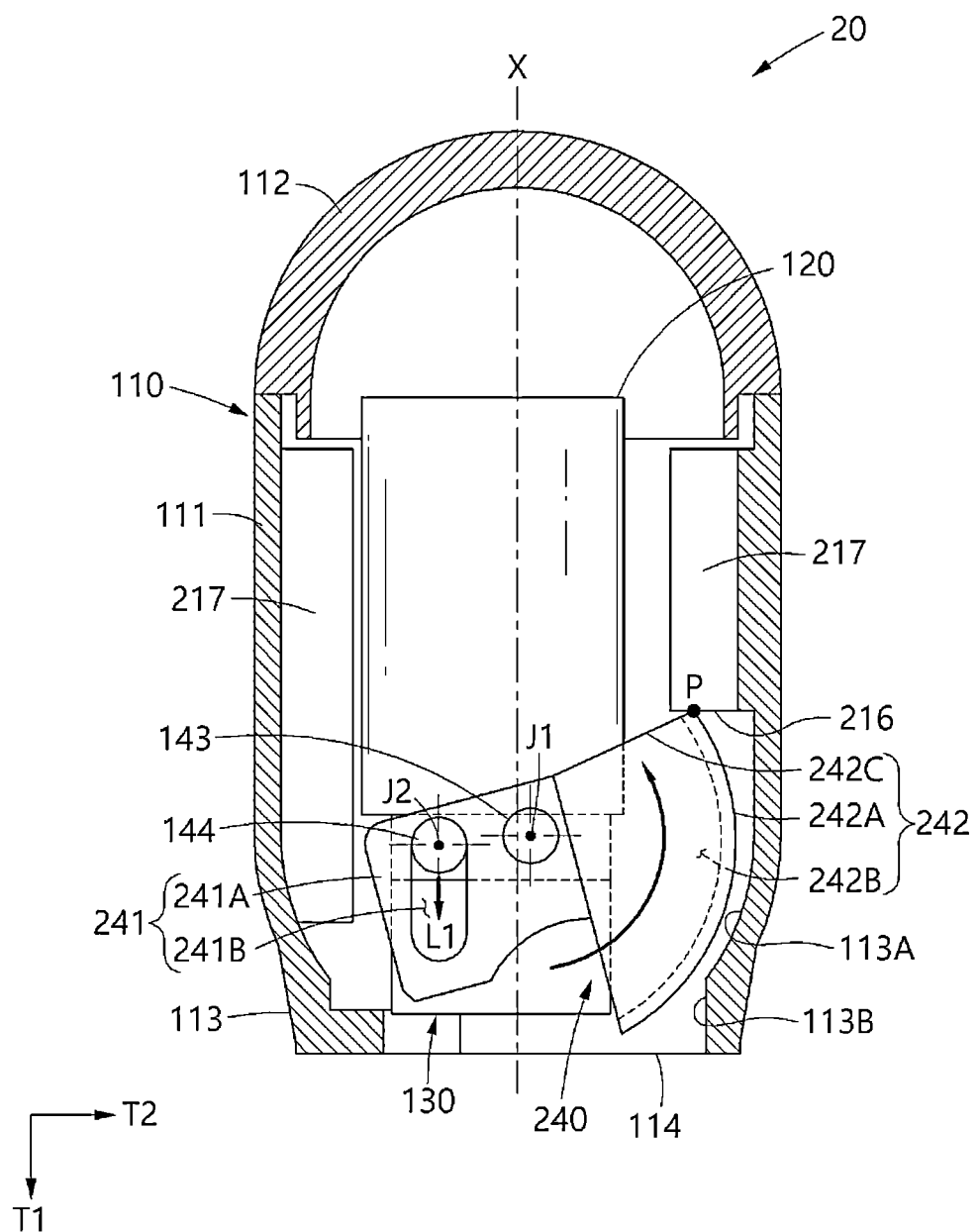

Basically, similar to the operation of the drug delivery device 10 according to the first embodiment, when the magnetic element 120 is magnetically coupled and the magnetic element 120 and the reservoir 130 receive the force in the direction toward the opening 114, the link 241 and the gate 242 are rotated by the moment of force R1 for allowing the second joint J2 to rotate about the first joint J1, such that the opening 114 is slowly opened. In this case, an end of a shell 242A provided at the outer edge 242C of the gate 242 comes into contact with the stopper 216, such that the movement of the gate 242 is restricted, and the state illustrated in FIG. 8 is implemented.

Figure 9:
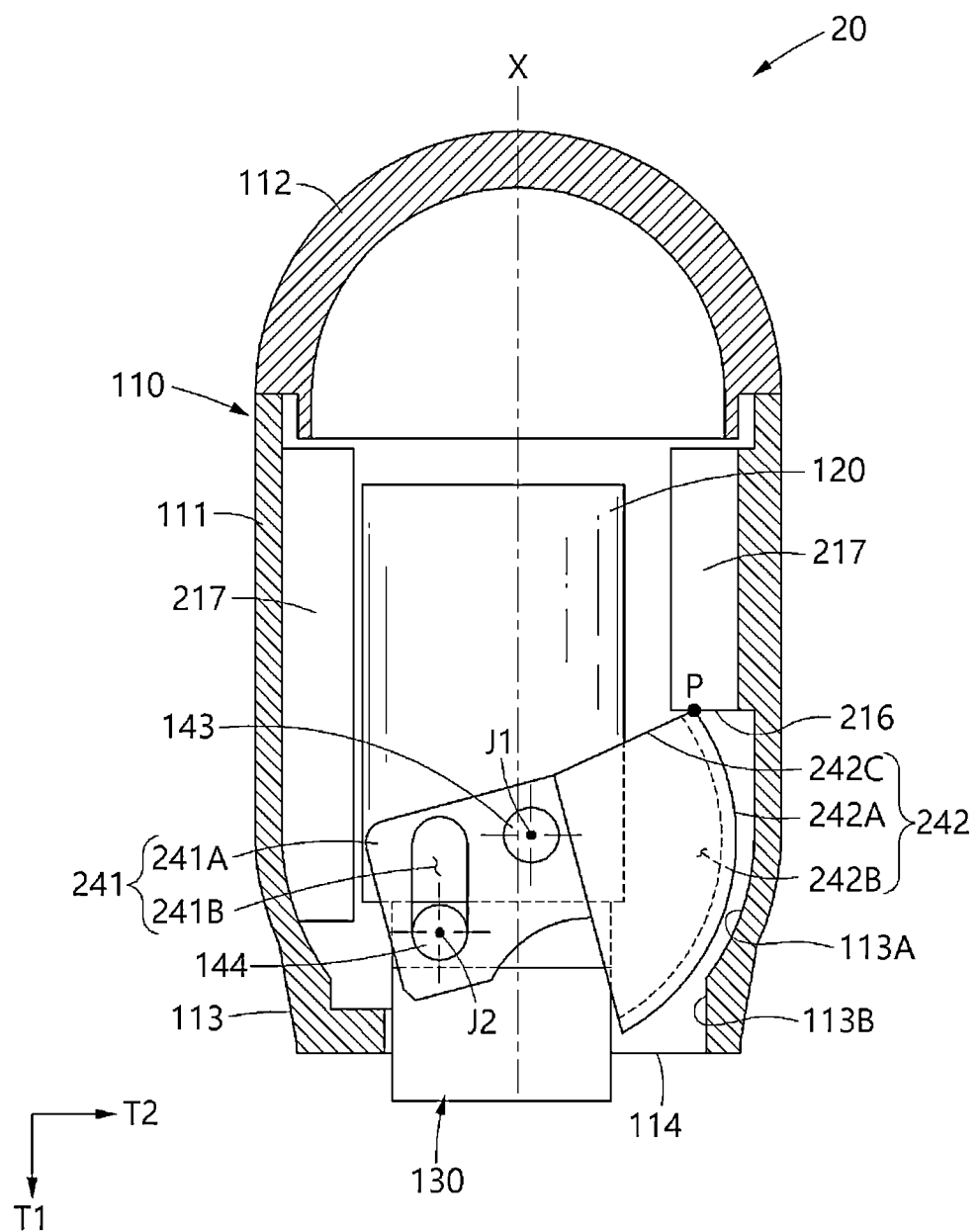

In this state, when the magnetic element 120 further receives the force, the reservoir 130 also further receives the force in the direction toward the opening 114, and the second coupling portion 144 moves along the slot 241B. Therefore, as illustrated in FIG. 9, at least a part of the reservoir 130 is moved away from the body 110 and further exposed to the outside of the body 110 through the opening 114. As described above, a degree to which the reservoir 130 is exposed in the second embodiment is larger than a degree to which the reservoir 130 is exposed in the first embodiment, which makes it possible to more smoothly deliver the drug to the target position on the object.

As previously described in the first embodiment, when the magnetic element 120 receives the force in the direction away from the opening 114, the second coupling portion 144 moves along the slot 241B in the direction away from the opening 114 in the order reverse to the above-mentioned order. Therefore, the degree to which the reservoir 130 is exposed decreases, the moment of force for allowing the second joint J2 to rotate about the first joint J1 clockwise is generated, and the link 241 and the gate 242 rotate about the first joint J1 clockwise, such that the opening 114 is closed.

Figure 10:
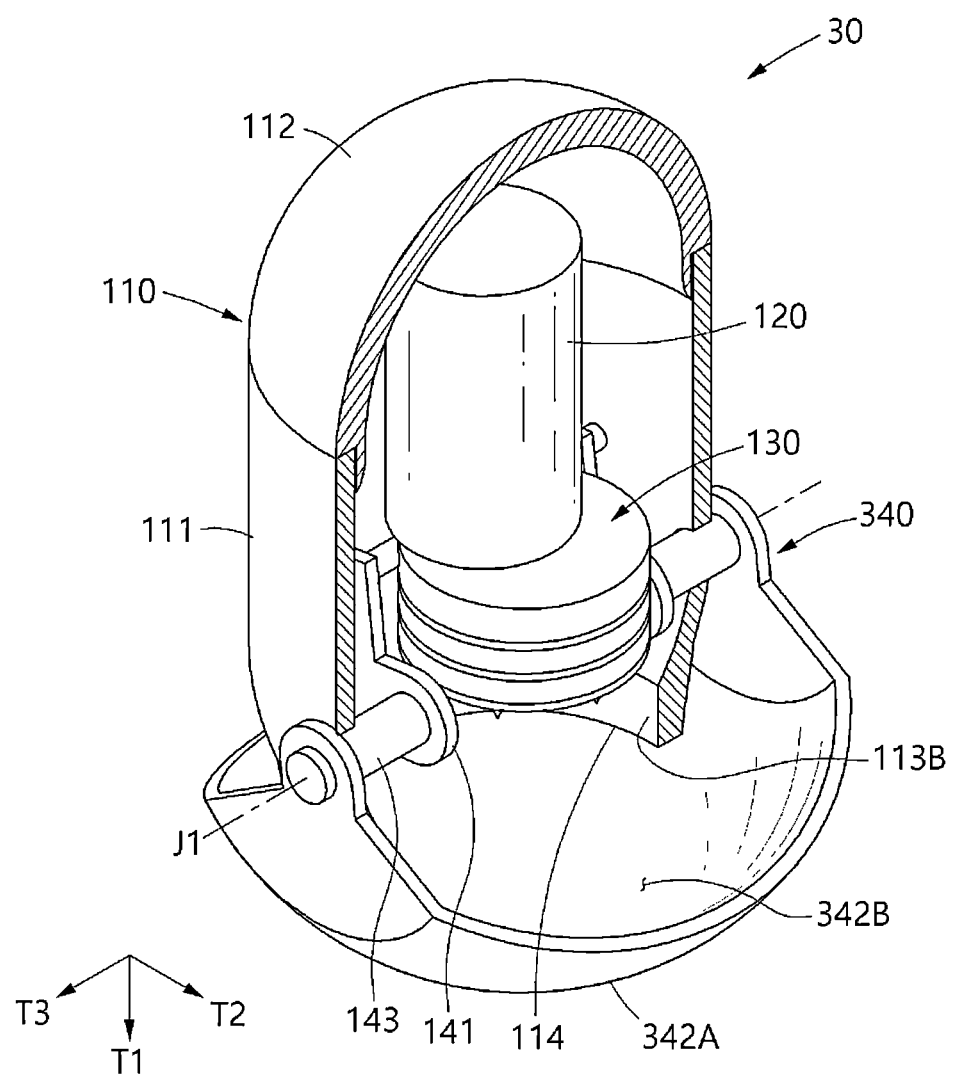
FIG. 10 is a perspective view illustrating a partial cross-section of a drug delivery device according to a third embodiment.
Figure 11:
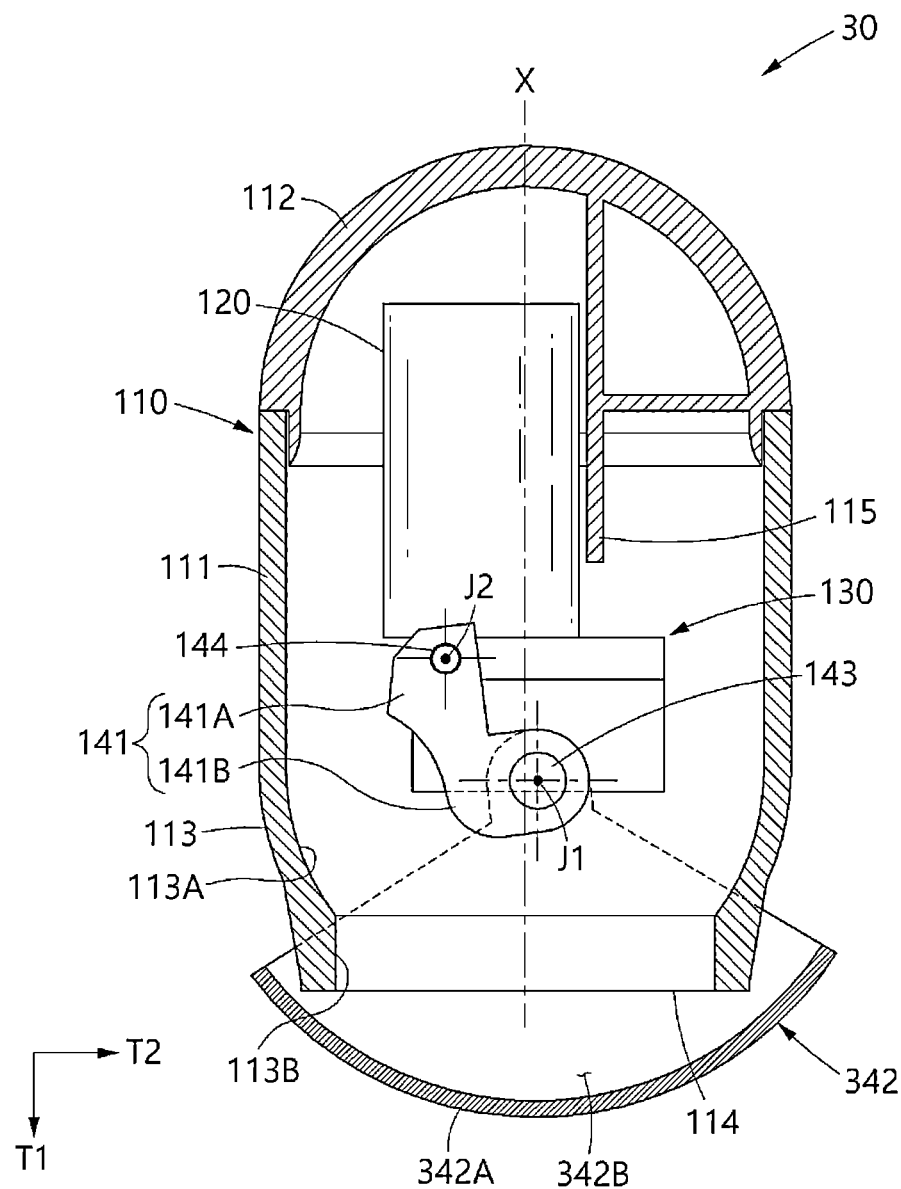
FIG. 11 is a partial cross-sectional view of the drug delivery device according to the third embodiment.
Figure 12:
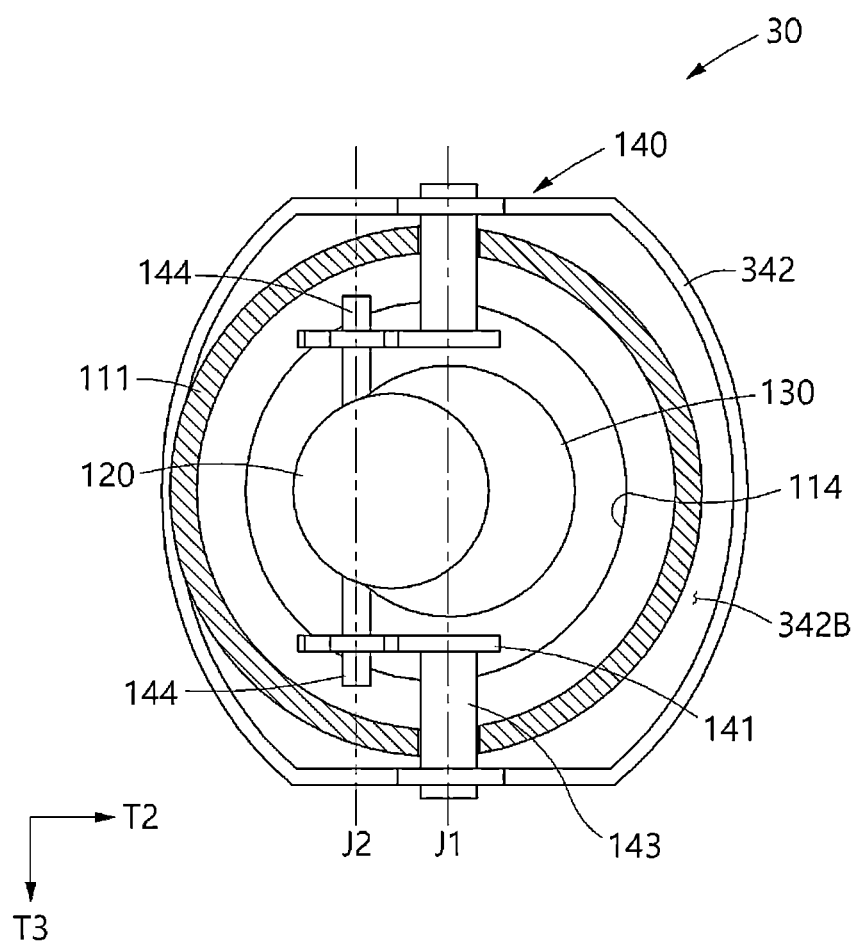
FIG. 12 is a view illustrating the drug delivery device according to the third embodiment when viewed from above.

Referring to FIGS. 10 to 12, unlike the above-mentioned structures according to the first and second embodiments, a drug delivery device 30 according to a third embodiment may include an opening/closing structure 340 including a gate 342 disposed outside the body 110 and configured to open or close the opening 114. A cavity 342B may be disposed between a shell 342A and the opening 114. The first coupling portion 143 configured to connect the link 141 and the gate 342 may have a shape extending while penetrating the central part 111 of the body 110. Meanwhile, the other constituent elements and the other operations, which are not described in this embodiment, are substantially identical to the corresponding constituent elements and the corresponding operations of the drug delivery devices according to the first and second embodiments. Therefore, detailed descriptions thereof will be omitted.

The gate 342 may rotate about the first joint J1 along an outer surface of the body 110. When the gate 342 rotates about the first joint J1 clockwise, the link 141 also rotates about the first joint J1 clockwise, such that the opening 114 may be opened, and the reservoir 130 may be exposed to the outside. In contrast, when the gate 342 rotates about the first joint J1 counterclockwise, the link 141 also rotates about the first joint J1 counterclockwise, such that the opening 114 may be closed, and the reservoir 130 may be protected from the outside.

While the embodiments have been described above with reference to the limited drawings, the embodiments may be variously and technologically modified and altered from the disclosure by those skilled in the art to which the embodiments pertain. For example, appropriate results may be achieved even though the described technologies are performed in different orders from the described method, the described constituent elements such as the systems, the structures, the apparatuses, and the circuits are coupled or combined in different manners from the described method, and/or the constituent elements are substituted with or replaced by other constituent elements or equivalents.

Accordingly, other implements, other exemplary embodiments, and equivalents to the appended claims are also included in the scope of the appended claims.

The drug delivery device according to the embodiment may protect the mechanism that serves to deliver the drug while the drug delivery device moves.

The effects of the drug delivery device according to the embodiment are not limited to the aforementioned effects, and other effects, which are not mentioned above, may be clearly understood by those skilled in the art from the following descriptions.

What is claimed is:

1. A drug delivery device comprising:
   a body comprising an opening;
   a magnetic element disposed in the body;
   a reservoir disposed in the body, connected to the magnetic element, and configured to store a drug; and
   an opening/closing structure coupled to the body and configured to open or close the opening,
   wherein a first joint is defined at a portion where the body and the opening/closing structure are coupled, and
   wherein the opening/closing structure is configured to have:
   a first configuration in which the opening/closing structure opens the opening while rotating about the first joint in a first rotation direction; and
   a second configuration in which the opening/closing structure closes the opening while rotating about the first joint in a second rotation direction opposite to the first rotation direction.

2. The drug delivery device of claim 1, wherein the opening/closing structure comprises a gate configured to rotate about the first joint.

3. The drug delivery device of claim 2, wherein the body comprises:
   a first inner surface formed at a periphery of the opening and having a curved profile; and
   a second inner surface configured to define the opening, and
   wherein the opening/closing structure moves along the first inner surface.

4. The drug delivery device of claim 3, wherein the gate comprises:
   a shell having an outer surface corresponding to a shape of the first inner surface; and
   a cavity defined in the shell and configured such that at least a part of the reservoir is disposed in the cavity.

5. The drug delivery device of claim 2, wherein the body further comprises a stopper protruding from an inner wall of the body and configured to restrict a movement of the gate.

6. The drug delivery device of claim 2, wherein the gate rotates along an outer surface of the body.

7. The drug delivery device of claim 1, wherein the opening/closing structure comprises a link, and
   wherein the link comprises:
   a first coupling portion configured to define the first joint and coupled to the body; and
   a second coupling portion configured to define a second joint and coupled to the reservoir.

8. The drug delivery device of claim 7, wherein the second coupling portion rotates about the first coupling portion.

9. The drug delivery device of claim 7, wherein the first joint and the second joint are positioned on different planes.

10. The drug delivery device of claim 7, wherein the link comprises:
    a first extension portion coupled to the second coupling portion and extending in a first direction; and
    a second extension portion coupled to the first coupling portion and extending in a second direction intersecting the first direction.

11. The drug delivery device of claim 7, wherein the link comprises:
    a rotary body coupled to the first coupling portion and configured to rotate about the first joint; and
    a longitudinal slot formed in the rotary body and configured to engage with the second coupling portion, the slot having a first end and a second end at an opposite side to the first end and being configured to allow the second coupling portion to move between the first end and the second end.

12. The drug delivery device of claim 11, wherein the opening/closing structure is configured to have a third configuration in which the second joint moves from the first end to the second end and at least a part of the reservoir is exposed to the outside of the body through the opening.

13. The drug delivery device of claim 1, wherein the reservoir comprises:
    a substrate configured to store the drug; and
    a plurality of needle patches arranged on the substrate and configured to transfer the drug from the substrate.

* * * * *